Feb. 26, 1929.
J. BECKER
1,703,654
MEANS AND METHOD OF DEHYDRATING FLAKED AGAR OR THE LIKE
Filed Dec. 4, 1926
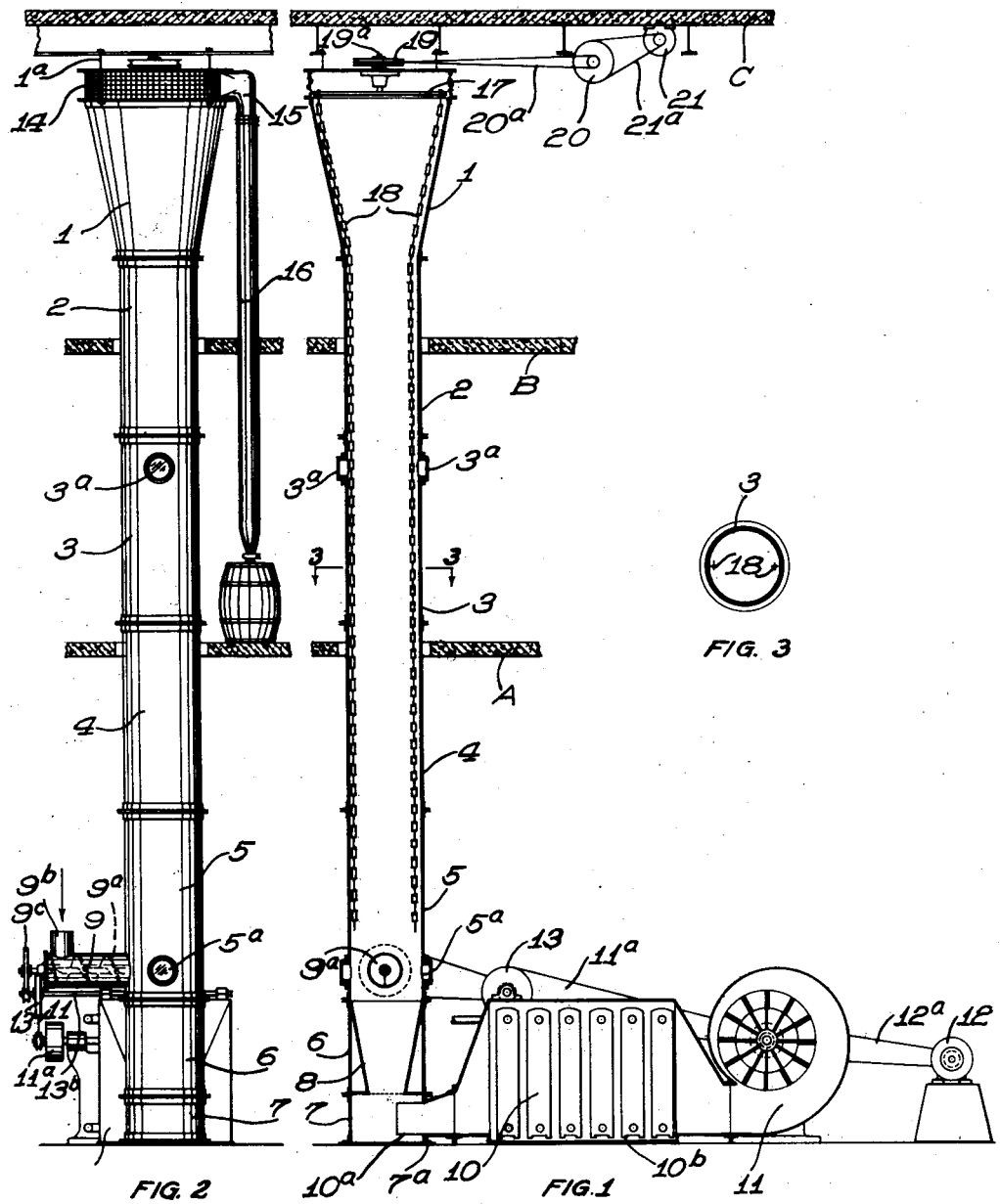
Inventor
JOHN BECKER
By A. B. Bowman
Attorney Patented Feb. 26, 1929.

1,703,654

UNITED STATES PATENT OFFICE.

JOHN BECKER, OF SAN DIEGO, CALIFORNIA.

MEANS AND METHOD OF DEHYDRATING FLAKED AGAR OR THE LIKE.

Application filed December 4, 1926. Serial No. 152,717.

My invention relates to a means and method of dehydrating flaked agar or the like, and the objects of my invention are: First, to provide a novel means of dehydrating flaked agar or similar products; second, to provide a novel method of dehydrating flaked agar or similar products; third, to provide a means and method of dehydrating flaked agar or the like which is automatic in its action; fourth, to provide a dehydrater of this class which very quickly dehydrates flaked agar or the like; fifth, to provide a means and method of this class in which the flaked agar or the like is kept in suspension in a draught of heated air until it is light enough to pass up to the top and out, and sixth, to provide a means and method of this class which is very simple and economical of construction, durable, efficient in its action, inexpensive in operation, and which will not readily deteriorate or get out of order.

With these and other objects in view, as will appear hereinafter, my invention consists of certain novel features of construction, combination and arrangement of parts and portions and a certain method, as will be hereinafter described in detail and particularly set forth in the appended claims, reference being had to the accompanying drawings and to the characters of reference thereon, which form a part of this application, in which:

Figure 1 is a longitudinal sectional view of my dehydrater, showing some of the parts and portions in elevation to facilitate the illustration; Fig. 2 is a side elevational view thereof at a right angle thereto, and Fig. 3 is a transverse sectional view through 3—3 of Fig. 1.

Similar characters of reference refer to similar parts and portions throughout the several views of the drawings.

The stack, consisting of the sections 1, 2, 3, 4, 5, 6 and 7, contraction member 8, casing 9, steam radiator 10, blower 11, motor 12, pulley 13, screen 14, outlet member 15, fabric conductor 16, rotor 17, chains 18, pulley 19, pulley 20, and motor 21, constitute the principal parts and portions of my flaked agar dehydrating means and equipment for carrying out my method.

The stack, consisting of the members 1, 2, 3, 4, 5, 6 and 7, is placed in a vertical position, preferably extending through floors A and B and supported on an upper floor C. It is preferably made of sheet aluminum for sanitary purposes.

The lower section 7, which is the base section, is provided in one side with an opening $7^a$ into which extends the outlet end $10^a$ of the casing $10^b$ for the steam radiator 10. In this casing is mounted the radiator 10, which is supplied with steam from any steam source. The inlet end of this casing $10^b$ communicates with the outlet for the blower 11, which blower 11 is operated by the motor 12 through a belt $12^a$.

Mounted on the section 7 is the section 6, rigidly secured thereto. This section 6 is provided with a reduced portion 8, providing a narrow throat adjacent the outlet $10^a$ of the casing $10^b$.

Mounted on the upper end of this section 6 is the section 5. Communicating with this section 5 at its lower end is a small casing 9 in which is mounted a screw conveyer $9^a$. In the upper side of the casing 9 is an inlet conductor $9^b$, which is adapted to receive the wet flaked agar ready to be dehydrated. This screw $9^a$ is operated by means of a pulley $9^c$, which pulley $9^c$ is operated by a belt from a pulley $13^a$ on a shaft $13^b$ supported on the casing $10^b$ and on which is mounted a pulley 13, which is operated by a belt $11^a$, which is mounted on the pulley on the shaft of the blower 11, thus providing means for operating the conveyer 9 at low speed. Mounted in the lower end of this section 5 are observation glasses $5^a$ for observing the action of the flaked agar during the dehydrating process. Mounted in the sides of the section 3 are also observation glasses $3^a$ for similar purposes.

The upper section 1, it will be observed, is flared outwardly, and this upper end is supported by means of a plurality of bolts $1^a$ supported on the floor C above the upper end of the section 1 and extending down through the flange on the upper end of the section.

It will be here noted that the sections 1, 2, 3, 4, 5, 6 and 7 are secured together by means of angle members on the edges of the sections and bolts or rivets, it being the preferred means of securing them together.

Mounted on the upper end of the section 1 is a screen 14, which is circular in shape, and on one side is provided an orifice in which is mounted the L-shaped outlet conductor 15, which is the place for the exit of the dehydrated flaked agar. Secured on the lower end of this member 15 is a flexible fabric tube 16, which extends downwardly and serves as a conductor to the flaked agar receptacle. In this case I have shown a barrel for receiving the dehydrated agar, positioned on the floor A.

Revolubly mounted centrally in the upper side of the screen 14 is a shaft 19$^a$ on which is mounted a pulley 19. Mounted on the lower end of this shaft 19$^a$ is a rotor 17, which is adapted to be rotated on the shaft 19$^a$. Suspended from the opposite end of this rotor 17 are chains 18, which extend to near the bottom of the stack, as shown best in Fig. 1 of the drawings. This rotor member 17 is revolved by means of the shaft 19$^a$ and pulley 19 through a belt 20$^a$ on the pulley 20 and a belt 21$^a$ from the motor 21, which motor is preferably suspended on the floor C. Thus, I have provided means for revolving the rotor 17 and therefore the suspended chains 18, providing agitating and whirling means inside of the stack for agitating and whirling the flaked agar or the like.

It is obvious that in case it is desired to more effectively dehydrate the flaked material, the conductor 16 may be extended down and connect with another inlet opening 9$^b$ on another conductor stack and complete operating device attached to another series, the conductor shown being only one unit of which there may be a plurality as desired.

The operation and method of dehydrating agar or the like is as follows:

The wet flaked agar is conducted into the inlet 9$^b$ and is forced by the screw 9 into the lower end of the section 5 of the stack, where it is met by a blast of heated air from the steam radiator 10 under pressure from the blower 11, the contracted portion 8 being such as to cause a cyclonic, whirling effect near the mouth of the contracted portion 8 so as to break up and separate the flakes of agar. The heated air under pressure holds the flaked agar in suspension in the sections of the stack, and as it is dried by the air it gradually moves upwardly. As an additional agitating and whirling means, the chains 18 are revolved, which assist in causing a complete separation and agitation and whirling of the flaked agar in the current of heated air in the stack in its passage upwardly. As the flaked agar is dried, gravity is reduced and it passes up and out through the conductor 15 and into the conductor 16, the moist air passing through the walls of the conductor 16 and also through the walls of the screen 14, and the flakes drop down into the receptacle.

Though I have shown and described a particular means and method of dehydrating flaked agar and the like, I do not wish to be limited to this particular construction, combination and arrangement nor to the method, but desire to include in the scope of my invention, the construction, combination and arrangement and method substantially as set forth in the appended claims.

Having thus described my invention, what I claim as new and desire to secure by Letters Patent is:

1. In a means of the class described, a vertical stack, means for conducting heated air under pressure to the lower end of said stack, means for forcing flaked material to be dehydrated into said stack at said lower end above the heated air inlet, a screen at the upper end of said stack, an outlet in said screen, means for agitating the material in said stack the full length of said stack, and a contracted hood portion in said stack between the heated air inlet and the flaked material inlet.

2. In a means of the class described, a vertical stack provided with an upper flared end, means for conducting heated air under pressure to the lower end of said stack, means for conducting flaked material into said stack above the outlet of said air means, a bar revolubly mounted in the upper end of said stack, and chains secured on the opposite ends of said bar and suspended in said stack.

3. In a means of the class described, a vertical stack provided with an upper flared end, means for conducting heated air under pressure to the lower end of said stack, means for conducting flaked material into said stack above the outlet of said air means, a bar revolubly mounted in the upper end of said stack, chains secured on the opposite ends of said bar and suspended in said stack, and a screen mounted on the upper flanged end of said stack provided with an outlet in one side thereof.

4. In a means of the class described, a vertical stack provided with an upper flared end, means for conducting heated air under pressure to the lower end of said stack, means for conducting flaked material into said stack above the outlet of said air means, a bar revolubly mounted in the upper end of said stack, chains secured on the opposite ends of said bar and suspended in said stack, a screen mounted on the upper flanged end of said stack provided with an outlet in one side thereof, and a conductor connecting with said outlet.

5. In a means of the class described, a vertical stack provided with an upper flared end, means for conducting heated air under pressure to the lower end of said stack, means for conducting flaked material into said stack above the outlet of said air means, a bar revolubly mounted in the upper end of said stack, chains secured on the opposite ends of said bar and suspended in said stack, a screen mounted on the upper flanged end of said stack provided with an outlet in one side thereof, and a conductor connecting with said outlet, said conductor being made of fabric material.

6. In a means of the class described, a vertical stack provided with an upper flared end and provided with an inlet opening at its lower end, a contracted member in said stack at its lower end above said opening, a casing with its outlet communicating with said opening, steam radiators mounted in said casing, a blower connected with the inlet end of said casing, and a conveyer communicating with said stack above the contracted member in said stack at its lower end.

7. In a means of the class described, a vertical stack provided with an upper flared end and provided with an inlet opening at its lower end, a contracted member in said stack above said opening, a casing with its outlet communicating with said opening, steam radiators mounted in said casing, a blower connected with the inlet end of said casing, a conveyer communicating with said stack above the contracted member in said stack, a screen mounted on the upper end of said stack provided with an outlet opening in one side thereof, a bar revolubly mounted centrally in said screen, and chains suspended from the opposite ends of said bar at its lower end.

8. In a means of the class described, a vertical stack provided with an upper flared end and provided with an inlet opening at its lower end, a contracted member in said stack above said opening, a casing with its outlet communicating with said opening, steam radiators mounted in said casing, a blower connected with the inlet end of said casing, a conveyer communicating with said stack above the contracted member in said stack, a screen mounted on the upper end of said stack provided with an outlet opening in one side thereof, a bar revolubly mounted centrally in said screen, chains suspended from the opposite ends of said bar, and means for revolving said bar.

9. The herein described method of dehydrating flaked material, consisting in first forcing a blast of heated air under pressure into a vertical stack at its lower end, then conducting the flaked material into said blast in said stack, then agitating the mass in its upward movement in said stack, then screening the air from the mass at the upper end, and then conducting the flaked agar downwardly through a perforate tube.

In testimony whereof, I have hereunto set my hand at San Diego, California, this 27th day of November, 1926.

JOHN BECKER.